United States Patent [19]

Duffield

[11] 4,361,342
[45] Nov. 30, 1982

[54] TOW HITCH ASSEMBLY

[76] Inventor: Melvern L. Duffield, 3000 S. Prairie Ave., Pueblo, Colo. 81005

[21] Appl. No.: 191,946

[22] Filed: Sep. 29, 1980

[51] Int. Cl.³ .......................... B60D 1/06; B60D 1/14
[52] U.S. Cl. ............................... 280/491 E; 280/498; 280/512
[58] Field of Search ............... 280/494, 493, 492, 498, 280/491 B, 491 E, 495, 501, 512

[56] References Cited

U.S. PATENT DOCUMENTS

| | | | |
|---|---|---|---|
| 1,245,676 | 11/1917 | Cadman | 280/493 X |
| 1,356,076 | 10/1920 | Litten | 280/498 X |
| 1,543,304 | 6/1925 | Tomlinson | 280/494 |
| 1,807,379 | 5/1931 | Burrows | 280/494 |
| 2,306,388 | 12/1942 | Johnson et al. | 280/495 |
| 2,693,368 | 11/1954 | Petron | 280/482 |
| 2,753,193 | 7/1956 | Halverson | 280/501 |
| 2,886,344 | 5/1959 | Beach et al. | 280/494 X |
| 3,155,399 | 11/1964 | Fetzko | 280/482 |
| 3,281,164 | 10/1966 | Reaser | 280/501 |
| 3,549,173 | 12/1970 | Stanfield | 280/457 |
| 3,567,253 | 3/1971 | De Puydt et al. | 280/512 |
| 3,737,177 | 6/1973 | Gal | 280/493 X |
| 3,768,837 | 10/1973 | Reese | 280/495 |
| 3,891,237 | 6/1975 | Allen | 280/477 |
| 4,050,714 | 9/1977 | Epp | 280/495 |

FOREIGN PATENT DOCUMENTS 449916 7/1948 Canada .................. 280/494

Primary Examiner—John A. Pekar
Attorney, Agent, or Firm—Young & Martin

[57] ABSTRACT

A tow hitch assembly for connecting a tractor vehicle to a trailer vehicle includes a mounting member adapted to be secured to the frame of one of the vehicles and a tow bar releasably securable to the mounting member at one end and adapted to be secured at its opposite end to the other vehicle. The connection between the tow bar and mounting member is defined by a pair of spaced-apart, parallel disc-shaped knuckles mounted on either side of a tangential flat surface on the mounting member and by a rounded nose forming the end of the tow bar which nose has a pair of flat sidewalls. The nose is sized for close-fitting insertion between the knuckles and has a radius of curvature that is the same as the radius of curvature of the knuckles. The knuckles and the nose have alignable bores so that a pin may be inserted therethrough to releasably secure the tow bar and mounting member together. By having a common radius of curvature with the knuckles, the tow bar is pivotal about the pin in a vertical plane with the rounded surface of its nose adjacent the tangential flat surface and with its sidewalls adjacent a respective knuckle. In an alternate embodiment, the mounting member is releasably secured to a bracket mounted to the frame of one of the vehicles.

12 Claims, 9 Drawing Figures

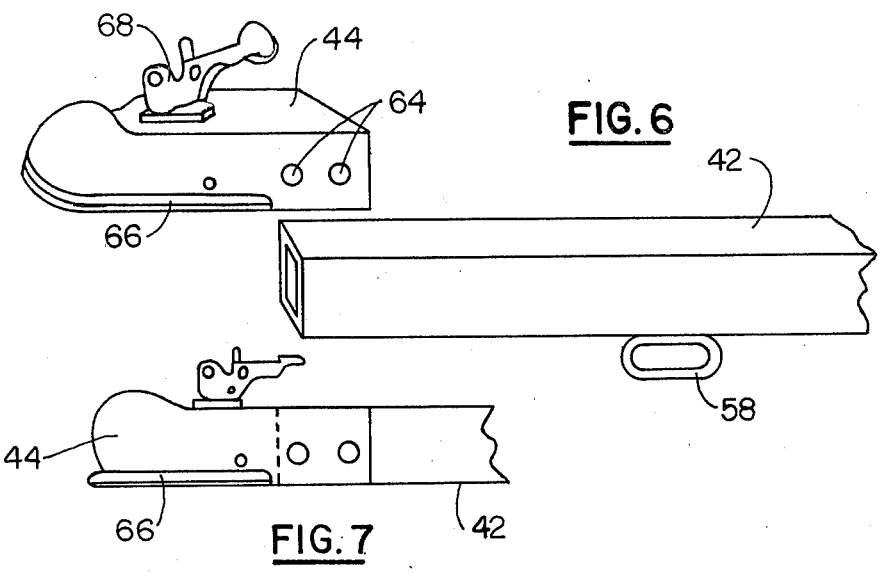
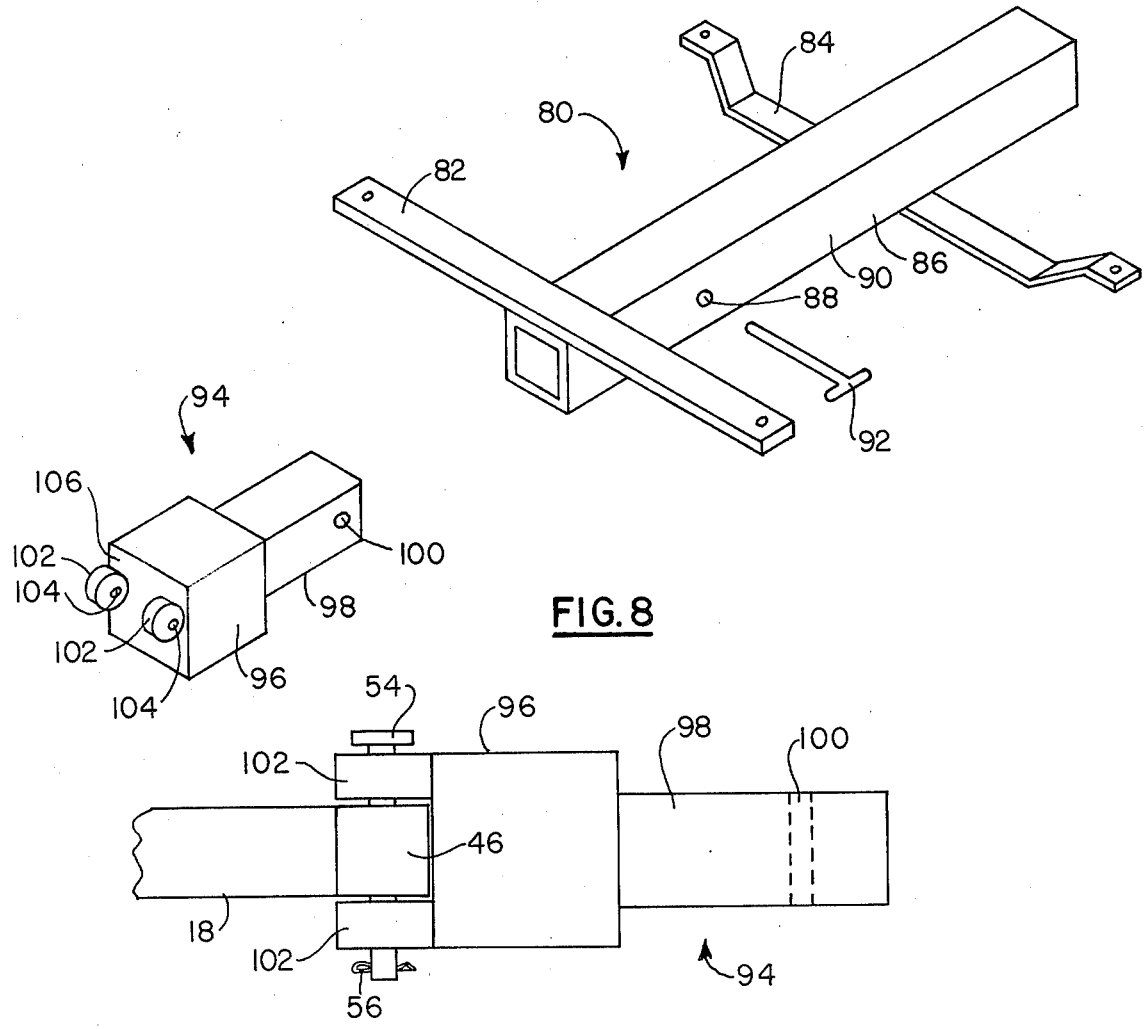

TOW HITCH ASSEMBLY

BACKGROUND OF THE INVENTION

The present invention relates to a tow bar assembly adapted to allow a tractor vehicle to tow a trailer vehicle and is particularly adapted for use in towing a four-wheel drive vehicle by another vehicle. The tow bar assembly includes a mounting member which is adapted to be attached either directly or indirectly to the frame of one of the vehicles and a tow bar member which is releasably securable to the mounting member at one end and which has a standard ball-type hitch at its opposite end. In the past, various towing structures have been provided between vehicles, and it is quite common for such structures to be attached to the frame of one of the vehicles with the vehicles being releasably connected by means of some sort of towing bar. Thus, this basic structure is fairly well understood and developed in the prior art, although the present invention embodies improvements over this basic structure.

An example of a known tow assembly structure is disclosed in U.S. Pat. No. 3,891,237, issued to Allen, wherein an elongated mounting member is provided with a bell-shaped socket which lockably receives the tongue of a trailer ball hitch member. The mounting member is adapted to be attached to the trailer vehicle with the trailer ball hitch member matably receiving a tow ball connected to the tractor vehicle. Similarly, U.S. Pat. No. 2,693,368 to Petron discloses a tow bar consisting of an elongated member which adjustably telescopes within a sleeve and is latched by a spring pall in a selected position. This tow bar interconnects coupling elements attached to the frame of the tractor and trailer vehicles. Another patent which discloses the general arrangement described above is U.S. Pat. No. 3,768,837 issued to Reese, wherein an enlarged frame member is attachable to the underside of the vehicle with this frame member supporting a square tube socket which releasably receives a shank member of a ball hitch.

While these inventions have allowed the towing of one vehicle by another, it has been found that, in many circumstances, it is desirable to limit the degrees of freedom about which the various connecting elements of a tow bar assembly may pivot. In the case of the connection of a tow bar to the tractor vehicle, it has been found suitable to allow either two or three degrees of freedom for rotation about the connecting element while at the trailer vehicle, it has been found desirable to limit the degrees of freedom to a single axis of rotation. By so limiting the rotation about the connecting element at the trailer vehicle, the frequency of certain undesirable tendencies, such as jack-knifing or fishtailing can be diminished.

It is also desirable that a tow bar assembly be quickly and easily attachable between a tractor vehicle and a trailer vehicle. Further, should any portion of the assembly be permanently attached to one or the other of the vehicles, the same should be as unobtrusive as possible yet readily accessible. Some existing tow bar assemblies, such as are often used with four-wheel drive vehicles, comprise an A-shaped frame where the ends of the legs are pivotally connected to the bumper of the four-wheel drive vehicle. When not in use, this assembly is positioned in a verticle orientation, but, when the user desires to tow the vehicle, the assembly is pivoted to a generally horizontal orientation for connection to a tractor vehicle. While this assembly is suitable in terms of strength for the towing operation, it has the disadvantage of being permanently affixed to the four-wheel drive vehicle and often obscures a portion of the driver's vision when it is placed in the vertical storage position.

From the foregoing, it may be appreciated that there is a need for a structurally strong tow hitch assembly which is quickly and easily interconnected and removed from a tractor and trailer vehicle. Further, it should be appreciated that where a portion of the tow hitch assembly remains attached to one of the tractor or trailer vehicles, that permanent element should be as unobtrusive as possible in order to avoid blocking a driver's vision and to avoid unwanted projections which could injure anyone moving around the vehicle.

SUMMARY OF THE INVENTION

It is therefore an object of the present invention to provide a tow hitch assembly for use in releasably connecting a trailer vehicle to a tractor vehicle which allows quick and convenient attachment of the vehicles to one another.

It is another object of the present invention to provide a structurally strong tow hitch assembly suitable for allowing a trailer vehicle to be towed by a tractor vehicle wherein at least one element is secured to one of the vehicles in an unobtrusive yet readily accessible manner.

It is yet another object of the present invention to provide a tow hitch assembly whereby a trailer vehicle may be towed by a tractor vehicle wherein the assembly restrains the trailer vehicle from pivoting about all but a single axis.

It is a further object of the present invention to provide a tow hitch assembly which is of economic construction while providing suitable structural strength for allowing a trailer vehicle to be towed by a tractor vehicle.

A still further object of the present invention is to provide a tow hitch assembly which includes at least two elements one of which is detachable from the assembly and the other of which is permanently secured to the undercarriage of the vehicle in such a manner that, when not in use, the attached element does not interfere with the ordinary operation of the vehicle or otherwise provide structure which endangers the user of the vehicle.

To accomplish these objects, the present invention comprises a two-piece tow hitch assembly for interconnecting a tractor vehicle and a trailer vehicle. One of the elements is a mounting member preferably adapted to be attached to the frame of one of the vehicles. This mounting member terminates adjacent the vehicle bumper as a pair of spaced-apart, disc-shaped knuckles oriented in parallel, spaced-apart vertical planes. A tow bar forms the second element of the tow hitch assembly with the tow bar having one end terminating in a ball hitch connector with the opposite end terminating in a rounded nose formed with a radius common to that of the knuckles on the mounting member. This rounded nose is positionable between the knuckles so that the pair of knuckles and the rounded nose have a common, horizontal axis. A bore is formed in each knuckle as well as in the nose portion of the tow bar so that a connecting pin can pass therethrough along the horizontal axis thereby releasably securing the nose of the tow bar between the knuckles. By constructing the rounded nose of the tow bar at a common radius with the knuckles, this construction allows the tow bar to pivot about the connecting pin in a vertical plane perpendicular to the axis of the pin while preventing the tow bar from moving in other directions about the connecting pin. To this end, the surface of the mounting member between the knuckles is formed as a generally vertical planar surface at a tangent to the edge of the discs forming the knuckles.

Preferably, the present invention also includes an eye member mounted on the mid-section of the tow bar to receive a safety chain should the tractor and trailer vehicles become uncoupled. Specifically, a safety chain is normally attached at one end to the tractor vehicle and at the other end to the trailer vehicle. The eye member of the present invention is provided so that the chain may be passed therethrough when attached to the vehicles for this purpose. Also, to enhance the safety of the apparatus, an enlarged rim surrounds the opening of the trailer ball hitch member at the end of the tow bar opposite the rounded nose in order to reduce the chance of metal fatigue and splitting of the trailer hitch ball coupler.

In the alternate embodiment of the present invention, a bracket is mounted to the frame of one of the tractor and trailer vehicles, with the bracket including an elongated hollow tube-shaped member oriented longitudinally of the vehicle. The mounting member is formed to have a shank adapted to be inserted into the hollow member where it may be retained by any suitable connecting means such as a locking pin or the like. The disc-shaped knuckles are then formed on an enlarged head of the mounting member opposite the shank so that the knuckles slightly protrude outwardly from the undersurface of the vehicle.

BRIEF DESCRIPTION OF THE DRAWINGS

These and other objects of the present invention will become more apparent as the description proceeds taken in conjunction with the accompanying drawings, in which:

FIG. 6 shows the main body of the tow bar and trailer hitch ball coupler in perspective prior to attachment to one another;

FIG. 7 shows the main body of the tow bar and trailer hitch ball coupler mounted to one another;

FIG. 8 shows a perspective view of an alternate embodiment of the present invention; and FIG. 9 is a fragmentary top plan view of a portion of the tow bar shown connected to the alternate embodiment of the present invention shown in FIG. 8.

DETAILED DESCRIPTION OF THE PREFERRED EMBODIMENT

Figure 1:
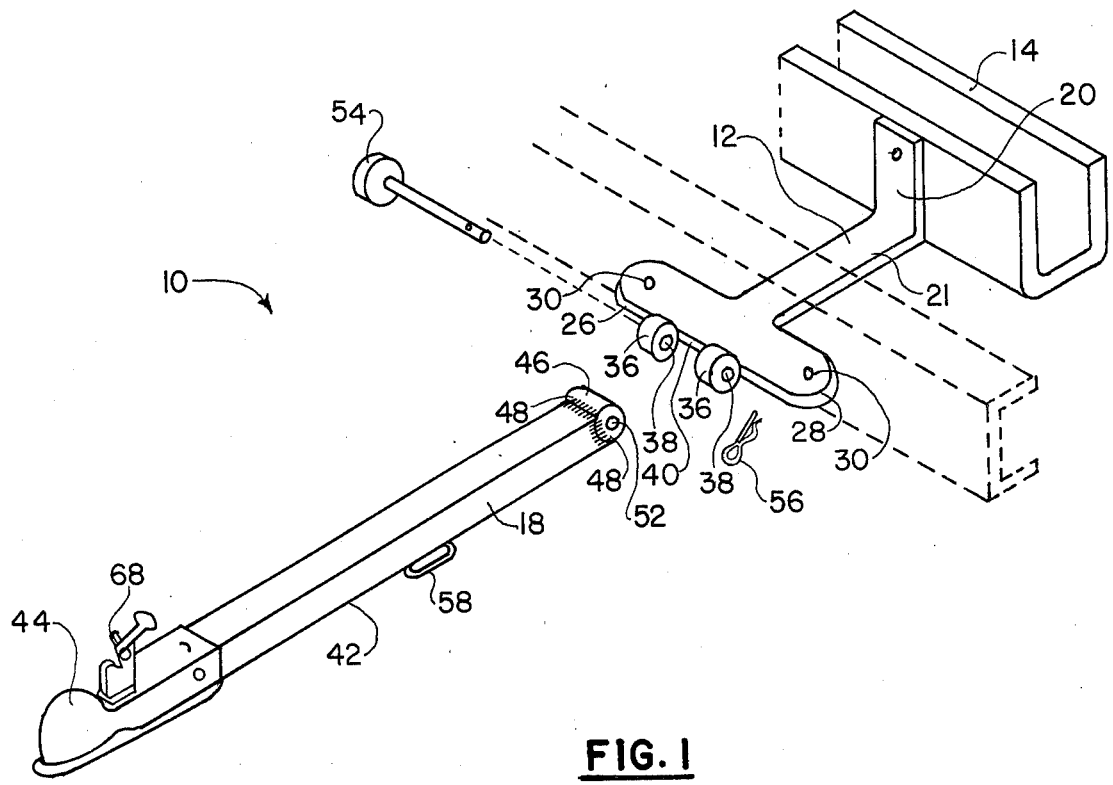
FIG. 1 is an exploded perspective view of the tow hitch assembly according to the preferred embodiment of the present invention.

The present invention relates to a tow hitch assembly particularly adapted for use where a tractor vehicle tows a trailer vehicle such as a four-wheel drive vehicle. The preferred embodiment of tow hitch assembly 10 is shown in FIG. 1 and basically comprises two main elements. The first element is a mounting member 12 which is attachable to the frame of one of the tractor and trailer vehicles, and is preferably attached to the trailer vehicle. The second element of tow hitch assembly 10 is tow bar 18 which is adapted to be releasably connectable to mounting member 12 as more fully described below.

Figure 2:
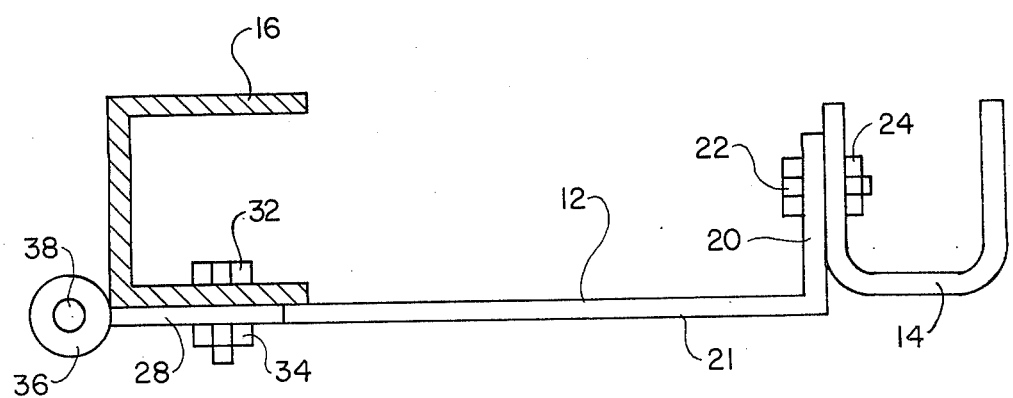
FIG. 2 is a side elevational view in cross-section of the mounting member according to the preferred embodiment of the present invention.

Mounting member 12 is shown in FIGS. 1 and 2 and is secured, for example, to frame elements of the trailer vehicle such as channel frame member 14 and bumper 16. While it should be understood that mounting member 12 must be attachable to different types of frames, and thus may vary somewhat in construction to accomplish this connection, mounting member 12 as shown in the preferred embodiment of the present invention consists of a T-shaped bar having an upturned foot 20 at the end of tongue member 21 with foot 20 being affixed to channel frame member 14 by means of a bolt 22 and a nut 24 with bolt 22 passing through alignable bores in foot 20 and channel member 14. Of course, foot 20 could be replaced by any end piece suitably configured to attach mounting member 12 to the vehicle underframe. Mounting member 12 is sized to extend outwardly from the frame member and pass under bumper 16 so that side wings 26 and 28, which are connected to tongue member 21, underlie bumper 16 and may be attached thereto. To this end, a pair of bores 30 are provided in side wings 26 and 28 and a pair of bolts such as bolt 32 secure each of side wings 26 and 28 to bumper 16 with bolts 32 passing through bores 30. Each bolt 32 is then securely fastened to bumper 16 by means of nut 34.

As shown in FIGS. 1 and 2, mounting member 12 includes a pair of knuckles 36 which protrude outwardly of the vehicle frame so that they extend beyond bumper 16 but are adjacent thereto. Knuckles 36 are formed as disc-shaped members oriented in spaced-apart generally vertical planes. The central axis of each is positioned along a common horizontal line substantially parallel to bumper 16. Knuckles 36 are each provided with a central bore 38 along this central axis so that bores 38 are aligned with one another with disc-shaped knuckles 36 being spaced apart from one another a sufficient distance to receive the end of tow bar 18 as described below. Knuckles 36 are attached to a flat end edge 78 of mounting member 12 so that, by mounting knuckles 36 in spaced-apart relation, a vertically oriented, flat surface 40 is formed along mounting member 12 with surface 40 being generally tangent to the circular edge surface of each of disc-shaped knuckles 36.

Figure 3:
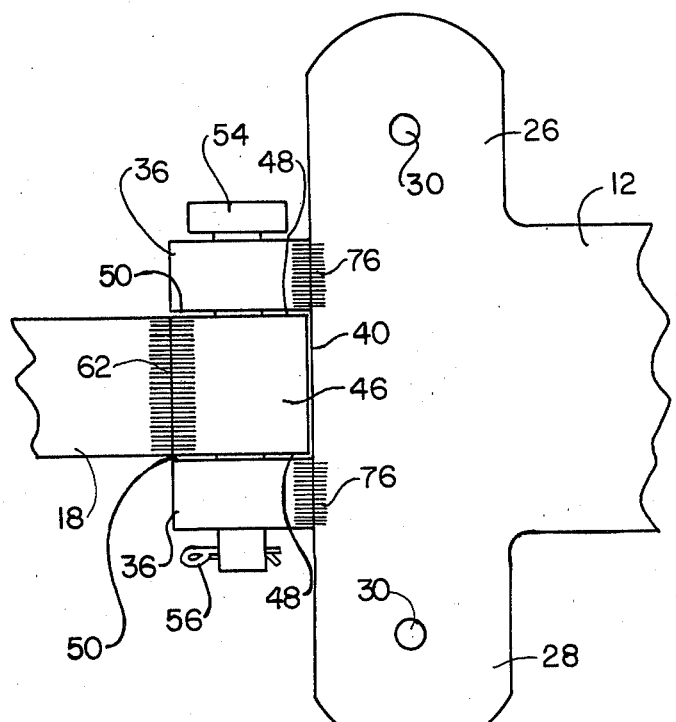
FIG. 3 is a fragmentary top plan view showing the connecting of the tow bar and mounting bracket according to the preferred embodiment of the present invention.

Tow bar 18 is shown in FIG. 1 in detached relation to mounting member 12, but is shown in FIG. 3 with its rounded end or nose attached to mounting member 12 between knuckles 36. Specifically, in the preferred embodiment, tow bar 18 has a main body 42 which is square-shaped in cross-section and terminates at a first end as a trailer hitch ball coupler 44, which is generally known in the art. At a second end, tow bar 18 terminates in a rounded nose 46 which has a pair of flat generally parallel sidewalls 48 with the distance between sidewalls 48 dimensioned to allow close-fitting insertion of nose 46 between the flat interior surfaces 50 of knuckles 36. Rounded nose 46 has a bore 52 passing therethrough between flat sidewalls 48, and nose 46 is formed so that is radius of curvature is the same as the radius curvature of knuckles 36. Thus, when nose 46 is positioned between knuckles 36 as shown in FIG. 3, the extreme end of nose 46 is adjacent vertical surface 40 in closely spaced-apart relation thereto.

In mounting tow bar 18 to mounting member 12, a connecting pin 54 is inserted through bores 40 and 52 to interlock knuckles 36 and rounded nose 46. Pin 54 is retained in the bores by means of a clasp pin 56 as is known in the art. Tow bar 18 is also preferably provided with an eye member 58 located along the midportion of its lower wall. Eye member 58 is dimensioned to receive a standard tow chain therethrough.

Figure 4:
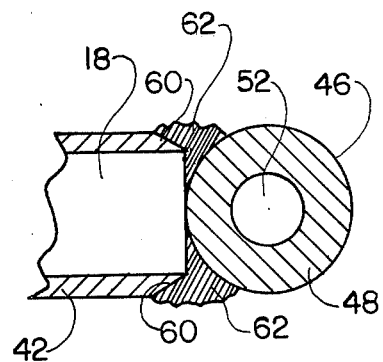
FIG. 4 is a fragmentary side view in cross-section of the end of the tow bar according to the preferred embodiment of the present invention.

The construction of mounting member 12 and tow bar 18 is shown in greater detail in FIGS. 4, 5, 6 and 7. In the preferred embodiment, main body 42 is formed out of two inch (5.0 cm) square steel tubing having a sidewall thickness of approximately ¼ inch (0.6 cm) and rounded nose 46 is formed out of a two inch long cylindrical segment of rod having a two inch (5.0 cm) diameter, as shown in FIG. 4. The ends of the cylindrical rod section then form sidewalls 48, and this cylindrical segment is welded onto main body 42 so that a structurally strong, rigid junction is formed therebetween. To this end, prior to the attachment of rounded nose 46 to main body 42, the end of main body 42 is ground to form converging tapered end surfaces 60 thereby increasing the available surface area to be contacted and joined by the weld joint as shown in FIG. 4. The cylindrical segment is then placed in abutting relationship to the end of main body 42 such that flat endwalls 48 are substantially planar with a pair of opposite sides of main body 42. Weld mass 62 then fuses main body 42 along surfaces 60 to rounded nose 46 to form a structurally sound joint around the perimeter of the end of the main body 42. Sidewalls 48 then define a continuation of the flat sidewalls of main body 42. Bore 52 is drilled through the central axis of the cylindrical rod segment either before or after this welding process.

The construction of tow bar 18 is completed by welding a standard trailer hitch ball coupler 44 onto the end of main body 42 opposite rounded nose 46, as is shown in FIGS. 6 and 7. Specifically, trailer hitch coupler 44 is a hitch ball coupler such as that manufactured by the Atwood Company of Rockford, Ill. which has female receiving means for receiving a trailer hitch ball and which includes a plurality of side holes 64. Main body 42 is inserted into the cavity defined by hitch ball coupler 44 as is shown in FIG. 7 and a suitable welding operation is performed to fuse these two pieces together, with this welding operation including a filling of holes 64 with weld plugs. An improvement of the present invention over the existing trailer hitch, however, is the addition of a raised lip or rim 66 which is formed out of ⅜ inch (0.95 cm) diameter steel rod configured to encircle the end of trailer hitch ball coupler 44 as shown in FIGS. 6 and 7. Rim 66 is welded to the edge of the hitch ball coupler so that the thickened section prevents tearing of the hitch ball coupler about the hitch ball cavity by placing a larger mass of material at a portion of the hitch ball coupler to counteract bending moments which are generated when the hitch ball coupler is secured to a hitch ball of a tractor vehicle. Hitch ball coupler 44 is provided with a standard latch mechanism 68 to secure the hitch ball coupler to a hitch ball as is well known in the art.

Figure 5:
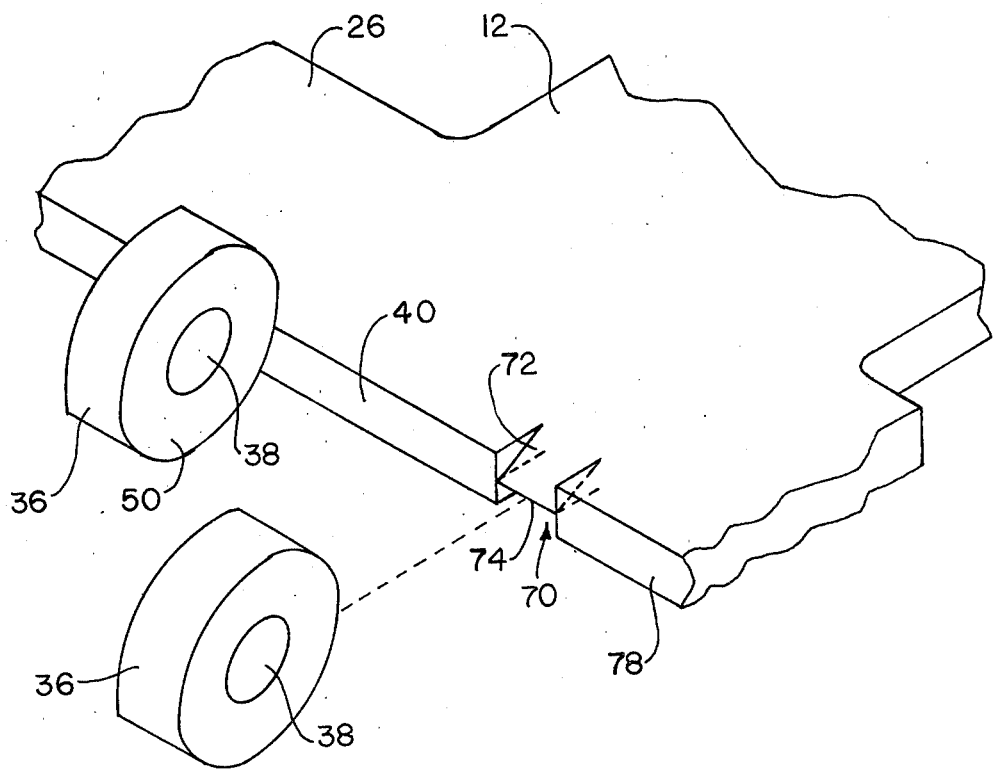
FIG. 5 is a partially exploded fragmentary view showing the relationship of the knuckles to the mounting member.

The assembly of mounting member 12 with knuckle members 36 is best shown in FIG. 5. Knuckles 36, as noted, are generally disc-shaped and are formed out of two inch (5.0 cm) diameter rod stock so that they are approximately one inch (2.5 cm) thick and two inches (5.0 cm) in diameter. Tow bar 18 should be of a length to allow sufficient clearance between the tractor and trailer vehicles so that when coupled the coupled vehicles may turn without coming in contact, yet the length should be short enough to minimize fish-tailing and jack-knifing of the vehicles. In typical application, it has been found suitable to construct the tow bar to have a length of ¾ to 1 meter, although this length is dependent upon the size of the two vehicles. Bores 38 are drilled through the central axis of each knuckle and knuckles 36 are welded to mounting member 12 slightly more than two inches (5.0 cm) apart so that nose portion 46 may snugly fit therebetween. Preferably, the width of nose portion 46 is on the order of 0.2 to 0.5 cm less than the distance between knuckles 36. In attaching knuckles 36 to mounting member 12, notches are cut in mounting member 12 such as notch 70 shown in FIG. 5. By forming notch 70, a wedge-shaped mounting portion 72 is formed in the edge of mounting member 12 so that the surfaces of wedge-shaped mounting portion 72 slope in directions to intersect the surface of the main body of mounting member 12. Each knuckle 36 is then positioned against a respective edge 72 of wedge-shaped portion 72 and is securely attached to mounting member 12 by means of a standard welding operation to form a structurally sound joint securely fastening knuckles 36 to mounting member 12. Each weld mass 76 completely fills a respective notch 70 to fuse knuckles 36 to the main body of mounting member 12 as is shown in FIG. 3. Accordingly, when knuckles 36 are positioned on mounting member 12, vertical surface 40 is defined by a portion of edge 78 of mounting member 12 to provide a pivot surface for nose 46. As noted, vertical surface 40 is tangential to disc-shaped knuckles 36 in a plane parallel to their central axes. Of course, for vertical surface 40 to be tangential, edge 74 of notch 70 must be co-planar with edge 78 of mounting member 12 when notch 70 is formed.

In operation, mounting member 12 is rigidly attached to the frame of either the tractor vehicle or the trailer vehicle, although it is preferred that mounting member 12 be attached to the frame of the trailer vehicle. To this end, it should be appreciated that the mounting structure of mounting member 12 may be altered to adapt to the frames of vehicles other than that shown, as an example, with respect to the preferred embodiment of the present invention. It is important, however, that mounting member 12 be constructed to position knuckles 36 so that they protrude outwardly from underneath the vehicle a sufficient distance to make knuckles 36 accessible for the attachment of tow bar 18.

Specifically, in operation, tow bar 18 is mounted to mounting member 12 by means of rounded nose 46 which is inserted between knuckles 36 so that bore 52 aligns with bores 38. Pin 54 may then be inserted through these aligned bores to secure nose 46 between knuckles 36. Pin 54 is releasably retained by means of clasp 56. In this mounting, as shown in FIG. 3, flat sidewalls 48 are in closely spaced-apart parallel relation to interior surfaces 50 with the extreme end of rounded nose portion 46 being in closely spaced-apart relation to vertical surface 40. Accordingly, tow bar 18 may then pivot about pin 54 in a vertical plane while being restrained from other degrees of freedom by sidewalls 48 and by vertical surface 40. Also, it should be noted that this pivoting is allowed since the radius of curvature of rounded nose 46 is the same as the radius of curvature of knuckles 36. The end of tow bar 18 opposite nose 46, of course, is then attached to a standard hitch ball with latch 68 securely retaining hitch ball coupler 44 onto the hitch ball of the vehicles. A safety chain may then interconnect the trailer vehicle to the tractor vehicle with the chain passing through eye member 58. Thus, eye member 58 prevents the chain from excessive motion or dragging.

FIGS. 8 and 9 show an alternate embodiment of the present invention which is adapted to be used with a conventional mounting bracket 80 secured to the underframe of a vehicle by means of mounting arms 82 and 84. This conventional bracket 80 includes an elongated hollow tube 86 which is square-shaped in cross-section and oriented along the longitudinal axis of the vehicle. Tube 86 is provided with a pair of holes 88 formed in opposite sidewalls 90 such that a mounting assembly element can be secured therein as described below. Particularly, the present invention contemplates the use of a mounting member 94 which has an enlarged head 96 and a shank 98 extending therefrom with the shank 98 being sized for telescopic insertion within the interior of tube 86. Shank 98 is provided with a transverse bore 100 which is positioned so that when shank 98 is inserted within tube 86, bore 100 aligns with holes 88. Mounting member 94 may then be secured within tube 86 by means of a conventional pin 92.

Enlarged head 96 mounts a pair of disc-shaped knuckles 102 on a side opposite shank 98 in a manner similar to that described with respect to the preferred embodiment. Specifically, enlarged head 96 includes an endwall 106 on which knuckles 102 are positioned in parallel spaced-apart relation. Endwall 106 includes a vertical flat portion between knuckles 102 similar to that described with respect to vertical surface 40, above. Knuckles 102 include axial bores 104 which are aligned with one another and with knuckles 102 being spaced apart a sufficient distance to allow insertion of tow bar 18 as shown in FIG. 9. Tow bar 18 is releasably secured between knuckles 102 by means of pin 54 and clasp pin 56 in a manner identical to that with respect to the preferred embodiment. To this end, knuckles 102 and rounded nose 46 are again sized to have the same radius of curvature so that tow bar 18 may pivot about pin 54 in a vertical plane. In operation, mounting member 94 is secured to mounting bracket 80 by inserting shank 98 into tube 86 and interconnecting these elements by means of pin 92. Enlarged head 96 is configured so that knuckles 102 will project outwardly from the vehicle and, after attachment of mounting member 94 to bracket 80, tow bar 18 may be secured to mounting member 94. It should be appreciated that, while the mounting member 94 is shown with a substantially cube-shaped head 96, other suitable configurations of enlarged head 96 are within the scope of this invention. Mounting member 94 may be welded together in a manner comparable to the preferred embodiment, or it may also be cast as a single unit.

Although the present invention has been described with a certain degree of particularity, it is understood that the present disclosure has been made by way of example and that changes in details of structure may be made without departing from the spirit thereof.

I claim:

1. A tow hitch assembly for use in connecting a trailer vehicle to a tractor vehicle, comprising:
    a mounting member adapted to be connected to a frame portion of one of said vehicles, said mounting member having a pair of spaced-apart disc-shaped knuckles extending outwardly from said one vehicle and each oriented in a vertical plane in spaced-apart, generally parallel relation to one another and having a surface portion of said mounting member therebetween, each said knuckle having a central bore therethrough with said bores being aligned on a common axis;
    a tow bar having connecting means on a first end thereof for connecting said first end to the other of said vehicles, and having a second end terminating in a rounded nose portion, said nose portion having a pair of flat, generally parallel sidewalls with a bore extending therethrough and a rounded endwall formed with a radius of curvature about said bore, said radius of curvature being approximately the same as the radius of curvature of said disc-shaped knuckles, said nose portion being sized to have a thickness between said parallel sidewalls to permit close-fitting insertion of said nose portion between said knuckles with the bore of said nose portion alignable with the bores of said knuckles to define a generally common horizontal axis whereby the surface of said nose portion endwall is in generally closely spaced relation to the surface portion of said mounting member between said knuckles for limiting the degrees of freedom about which to tow bar may pivot with respect to said mounting member; and
    a connecting pin insertable through the aligned bores of the knuckles and the nose portion and coextensive with said horizontal axis.

2. A tow hitch assembly according to claim 1 wherein said mounting member surface portion is substantially planar and is formed generally tangential to each of said knuckles whereby said tow bar may smoothly pivot in a plane perpendicular to a said horizontal axis with said nose portion smoothly rotating along said surface portion.

3. A tow hitch assembly according to claim 1 wherein said connecting means is a trailer hitch ball coupler, said coupler having female receiving means for receiving a hitch ball, said female receiving means being defined in part by a surrounding sidewall and rim, said coupler having an enlarged lip extending at least partially around the rim of said female receiving means, said lip dimensioned to have a thickness greater than the thickness of said sidewall.

4. A tow hitch assembly according to claim 1 including an eye member secured to a mid-portion of said tow bar.

5. A tow hitch assembly according to claim 1 wherein said tow bar has a square cross-section, said sidewalls of said nose portion formed as a continuation of a pair of opposite sidewalls of said tow bar.

6. A tow hitch assembly according to claim 1 wherein said mounting is adapted to be secured to a trailer vehicle having a bumper with a generally horizontal lower surface, said mounting member including a tongue adapted to extend underneath the trailer vehicle for connection to said frame portion and a pair of flat wings extending along the lower surface of said bumper for attachment in a substantially parallel relationship thereto.

7. A tow hitch assembly according to claim 1 including a bracket adapted to be secured to the frame portion of said one of said vehicles, said mounting member having a shank extending therefrom and said bracket including a hollow member sized to telescopically receive said shank and including releasable connecting means for securing said shank to said bracket.

8. A tow hitch assembly according to claim 1 wherein said knuckles are spaced apart approximately 5.0 cm and have a radius of curvature of approximately 2.5 cm, said knuckles each having a width approximately 2.5 cm in thickness, said nose portion having a width approximately 0.2 to 0.5 cm less than the distance between the knuckles.

9. A tow hitch assembly for use in connecting a first vehicle having a frame and a bumper to a second vehicle for the towing of one vehicle by the other, comprising:

a generally T-shaped mounting member having a flat tongue portion adapted to extend horizontally along the underside of said first vehicle for attachment to said frame and a pair of flat side wings extending in opposite directions horizontally along the underside of said bumper for attachment thereto;

a pair of disc-shaped knuckles attached to said bracket and projecting outwardly from the bumper in generally vertical, spaced-apart parallel planes, each of said knuckles having a flat surface facing the other one of said knuckles and a bore formed therethrough, said bores being aligned on a common axis, said bracket having a surface portion between said knuckles;

a tow bar having a first end including attachment means for attaching said tow bar to said second vehicle and a second end terminating in a nose portion, said nose portion having a pair of flat sidewalls spaced-apart a distance sufficient to allow close-fitting insertion of said nose portion between said knuckles, said nose portion having a rounded endwall with a radius of curvature equal to the radius of each said knuckle and a bore formed transversely therethrough, said bore in the nose portion alignable with the bores in said knuckles whereby said endwall is in closely spaced relation to the surface portion of said bracket, and said sidewalls are each in closely spaced relation to a flat surface of a respective one of said knuckles whereby the surface of said nose portion endwall may smoothly rotate along said surface portion of said bracket when said tow bar in pivoted in a plane perpendicular to said axis, said knuckles and said nose portion generally prohibiting said tow bar from pivoting in a direction out of said plane; and releasable connecting pin means adapted for extension through said bores when they are aligned to releasably secure said tow bar to said knuckles.

10. An improved tow hitch assembly for use in connecting a trailer vehicle to a tractor vehicle wherein a first one of said vehicles has a receiving bracket mounted to its frame with the receiving bracket having a hollow tube member positioned longitudinally along the underside of the vehicle, the improvement comprising:

a mounting member including a shank portion adapted to be telescopically received by said hollow tube member for releasably retaining said shank in engagement with said tube member, said mounting member having a pair of spaced-apart, disc-shaped knuckles on an end thereof opposite said shank, said mounting member having a surface portion between said knuckles, each knuckle having a bore formed therethrough, said bores being oriented on a common axis, said knuckles each positioned in a generally vertical plane when said mounting member is secured to said receiving bracket;

a tow bar having a first end including attachment means for attaching said tow bar to a second one of the vehicles and a second end terminating in a nose portion, said nose portion having a pair of sidewalls spaced-apart a distance to allow close-fitting insertion of said nose portion between said knuckles, said nose portion having a rounded endwall with a radius of curvature equal to the radius of curvature of each said knuckle and a bore formed transversely therethrough, said bore in the nose portion alignable with the bores in said knuckles whereby said endwall is in closely spaced relation to the surface portion of said bracket and said sidewalls are in closely spaced relation to a flat surface of a respective one of said knuckles whereby the surface of said nose portion endwall may smoothly rotate along said surface portion of said bracket when said tow bar is pivoted in a plane perpendicular to said axis, said knuckles and said nose portion generally prohibiting said tow bar from pivoting in a direction out of said plane; and releasable connecting pin means adapted for extension through said bores when they are aligned to releasably secure said tow bar to said knuckles.

11. An improved tow hitch assembly according to claim 9 or 10 including an eye member mounted on a midportion of said tow bar.

12. An improved tow hitch assembly according to claim 9 or 10 wherein said mounting member includes a surface area between said knuckles, said surface area being substantially planar in a plane tangent to said knuckles.

* * * * *

UNITED STATES PATENT AND TRADEMARK OFFICE
CERTIFICATE OF CORRECTION

PATENT NO. : 4,361,342

DATED : November 30, 1982

INVENTOR(S) : Duffield, Melvern

It is certified that error appears in the above-identified patent and that said Letters Patent is hereby corrected as shown below:

Column 1, line 66, please delete "verticle" and substitute --vertical--.

Column 5, line 6, please delete "is", first occurrence and insert -- its --.

In the Claims:

Claim 9, column 9, line 32: please delete "bracket" and substitute --mounting member--.

Claim 9, column 9, line 37: please delete "bracket" and substitute --mounting member--.

Claim 9, column 9, line 52: please delete "bracket" and substitute --mounting member--.

Claim 9, column 9, line 57: please delete "bracket" and substitute --mounting member--.

Claim 10, column 10, line 38: please delete "bracket" and substitute --mounting member--.

Claim 10, column 10, line 42: please delete "bracket" and substitute --mounting member--.

Signed and Sealed this

Second Day of August 1983

[SEAL]

Attest:

GERALD J. MOSSINGHOFF

Attesting Officer

Commissioner of Patents and Trademarks